United States Patent
Tsai et al.

(10) Patent No.: US 8,116,504 B2
(45) Date of Patent: Feb. 14, 2012

(54) ELECTRONIC DEVICE HAVING A RECEIVER

(75) Inventors: Ching-Sen Tsai, Tu-Cheng (TW); Mei-Tsu Tsao, Tu-Cheng (TW); Jia-Ren Chang, Tu-Cheng (TW)

(73) Assignee: Chi Mei Communication Systems, Inc., Tu-Cheng, New Taipei (TW)

( * ) Notice: Subject to any disclaimer, the term of this patent is extended or adjusted under 35 U.S.C. 154(b) by 854 days.

(21) Appl. No.: 12/190,668

(22) Filed: Aug. 13, 2008

(65) Prior Publication Data

US 2009/0296976 A1 Dec. 3, 2009

(30) Foreign Application Priority Data

May 27, 2008 (CN) .......................... 2008 1 0301794

(51) Int. Cl.
*H04R 1/02* (2006.01)

(52) U.S. Cl. ........ 381/386; 381/332; 381/388; 181/199; 455/575.1

(58) Field of Classification Search .......... 381/386–388, 381/160, 332–334, 430, 345–353, 575.1; 455/575.8, 90.3, 575.1; 181/198–199; 379/433.02, 379/428.01
See application file for complete search history.

(56) References Cited

U.S. PATENT DOCUMENTS

| | | | |
|---|---|---|---|
| 7,576,983 B2* | 8/2009 | Yamaguchi et al. | 361/679.55 |
| 7,746,627 B2* | 6/2010 | Yamaguchi et al. | 361/679.2 |
| 2004/0253995 A1* | 12/2004 | Matsumoto et al. | 455/569.1 |
| 2007/0115631 A1* | 5/2007 | Chen | 361/694 |
| 2007/0274557 A1* | 11/2007 | Chiba | 381/412 |

* cited by examiner

*Primary Examiner* — Michael Trinh
(74) *Attorney, Agent, or Firm* — Altis Law Group, Inc.

(57) ABSTRACT

An electronic device (20) includes a main board (32), a protective panel (24) defining a main bore (24a), a receiver (28) and a housing (22). The protective panel is joined to an upper portion of the housing, and the housing is joined to the main board to form a chamber receiving the receiver. The housing defines a first opening (22a) corresponding to the main bore of the protective panel. The receiver and the main bore are angled relative to each other such that the main bore is partially overlapped by the receiver to form at least one secondary bore (36) on the main bore.

12 Claims, 4 Drawing Sheets

ELECTRONIC DEVICE HAVING A RECEIVER

BACKGROUND OF THE INVENTION

1. Field of the Invention

The present invention relates to electronic devices having receivers and particularly to an electronic device having the improved audio output.

2. Discussion of the Related Art

With rapid developments in communication, portable electronic devices, such as cellular phones, personal digital assistants (PDA), and others have become more and more popular. Users are often not satisfied with only basic functionality of the portable electronic devices, that is, simply placing and receiving phone calls and short messages, desiring multimedia functions, such as displaying audio or video files, with the devices. To obtain audio effects of high quality when replaying multimedia files, the acoustic capabilities of the portable electronic devices must be improved.

Referring to FIG. 4, a typical electronic device 10 includes a housing 12 and a protective panel 14 assembled to an upper portion thereof, the housing 12 further including an installing portion 15 for installing a display, a plurality of bores 16, 18 providing resonance, and a chamber (not shown) arranged within the housing 12 for communicating with the bores 16, 18. The chamber includes a receiver (not shown) arranged therein for propagating the sounds by the bores 16, 18.

One solution to increase available volume in the conventional electronic device 10 is to define a greater number of bores 16, 18 or increase the size thereof. In this way, the housing 12 and the protective panel 14 have to define openings corresponding to the bores 16, 18. However, such designs affect the integrity of the structure of the protective panel 14, rendering it subject to damage.

Therefore, an electronic device having a receiver with a special arrangement is desirable in order to overcome the described limitations.

BRIEF DESCRIPTION OF THE DRAWINGS

Many aspects of the electronic device can be better understood with reference to the following drawings. The components in the drawings are not necessarily to scale, the emphasis instead being placed upon clearly illustrating the principles of the present electronic device. Moreover, in the drawings, like reference numerals designate corresponding parts throughout the several views.

DETAILED DESCRIPTION OF THE EMBODIMENTS

Figure 1:
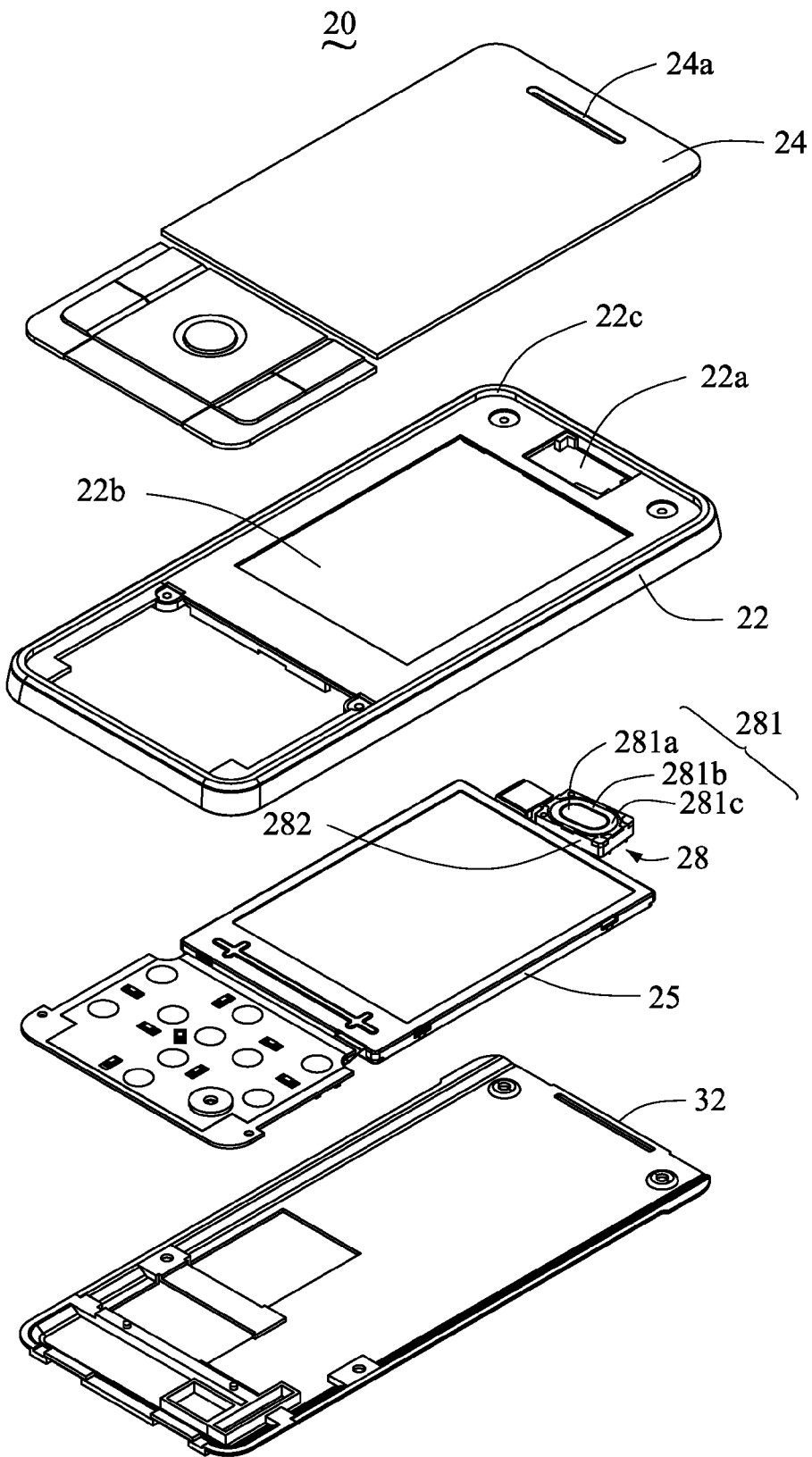
FIG. 1 is an exploded, isometric view of the electronic device according to an exemplary embodiment.

Referring to FIG. 1, a mobile phone is shown, used here as an exemplary embodiment of the electronic device 20, although it is to be noted that other portable electronic devices, such as personal digital assistants (PDA), are equally applicable within the disclosed scope. The electronic device 20 includes a protective panel 24, a housing 22, a receiver 28, a display 25, and a main board 32. The main board 32 is a substantially rectangular circuit board receiving the display 25, the receiver 28, and other electronic components.

The receiver 28 includes a speaker 281 and a substantially rectangular frame 282 receiving the speaker 281. The speaker 281 is received in the frame 282 and the center of the speaker 281 aligns with the center of the frame 282. The speaker 281 includes a front area 281a propagating received sounds, a substantially oval-shaped sponge 281b and sidewalls 281c surrounding the front area 281a. The sponge 281b is arranged above the front area 281a. To improve audio characteristics, the speaker 281 includes a back area (not shown) opposite to the front area 281a. The back area has a similar structure with the front area 281a.

Figure 2:
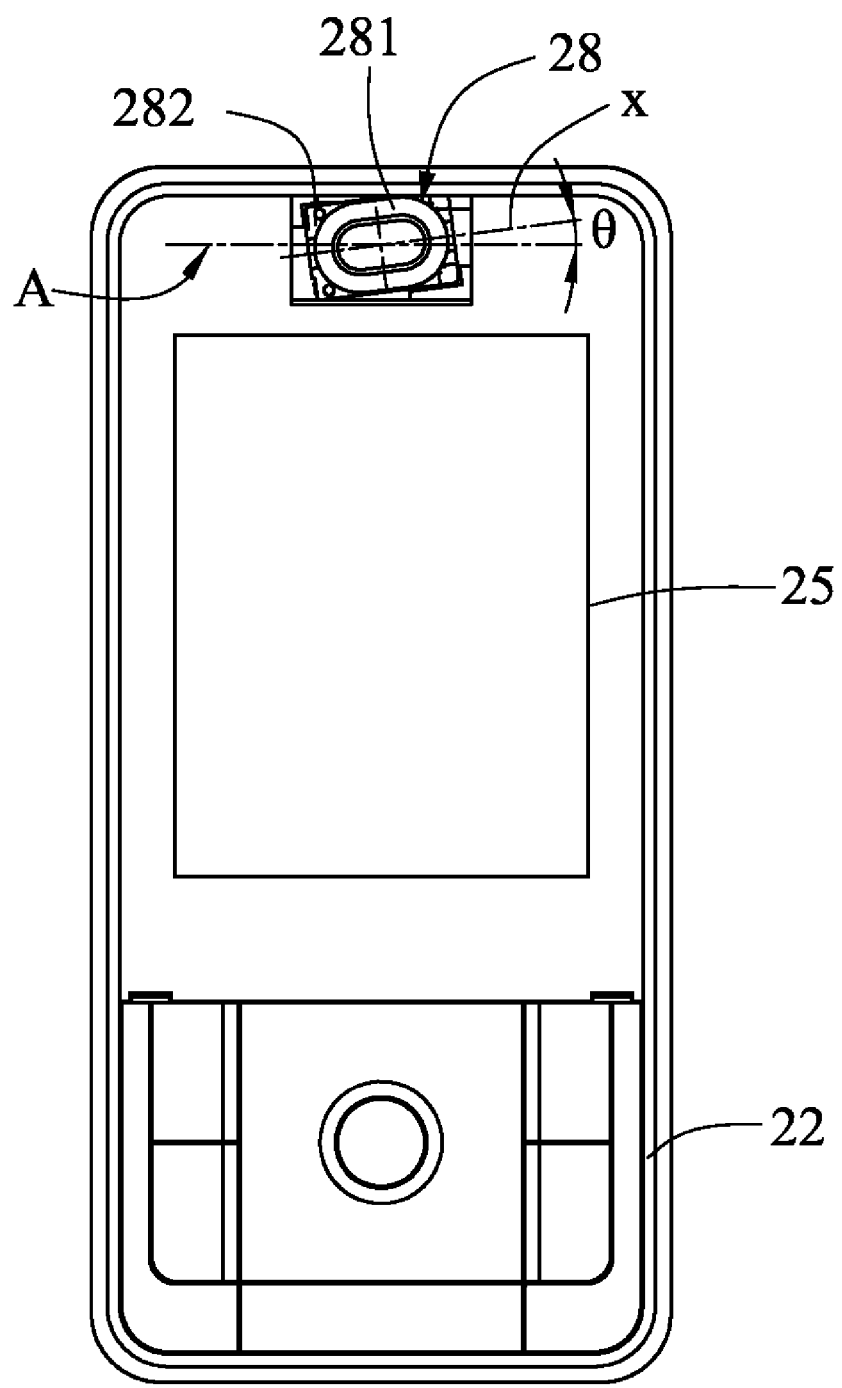
FIG. 2 is a partial assembled, isometric view of the present electronic device of FIG. 1.

The arrangement of the receiver 28 on the main board 32 is described in detail in relation to FIG. 2. The display 25 is a conventional display installed on the main board 32 for displaying information.

As shown in FIG. 1, the housing 22 defines a first opening 22a and a second opening 22b corresponding to locations of the receiver 28 and the display 25 arranged on the main board 32. It is to be noted that the dimensions of the first opening 22a substantially correspond to those of the receiver 28, and the dimensions of the second opening 22b substantially correspond to those of the display 25.

In addition, the dimensions of the housing 22 substantially correspond to those of the main board 32. In assembly, the housing 22 joins the main board 32 to define a chamber (not shown) receiving the display 25, the receiver 28, and other electronic components.

The protective panel 24 is substantially rectangular and joins an upper portion of peripheral edges of the housing 22 to protect the display 25 and the receiver 28 from direct contact by tampering, dust, and more. The protective panel 24 defines a substantially longitudinal main bore 24a for conducting audio output from the receiver 28 to the exterior. The length of the main bore 24a substantially equals that of the receiver 28, and the width of the main bore 24a is less than that of the receiver 28, increasing rigidity of the protective panel 24.

FIG. 2 shows a partially assembled electronic device 20, wherein the display 25 and the receiver 28 are arranged on the main board 32 and the housing 22 is joined to the main board 32, but the protective panel 24 as yet is not joined to the housing 22. As shown in the drawings, line "A" represents a corresponding location of the main bore 24a of the protective panel 24, and the receiver 28 is installed on the main board 32 at an angle relative to the main bore 24a. The major axis "x" of the receiver 28 and the longitudinal axis of main bore 24a (line "A") form an included angle $\theta$. In the exemplary embodiment, the included angle $\theta$ is between about 5 and 35°.

Figure 3:
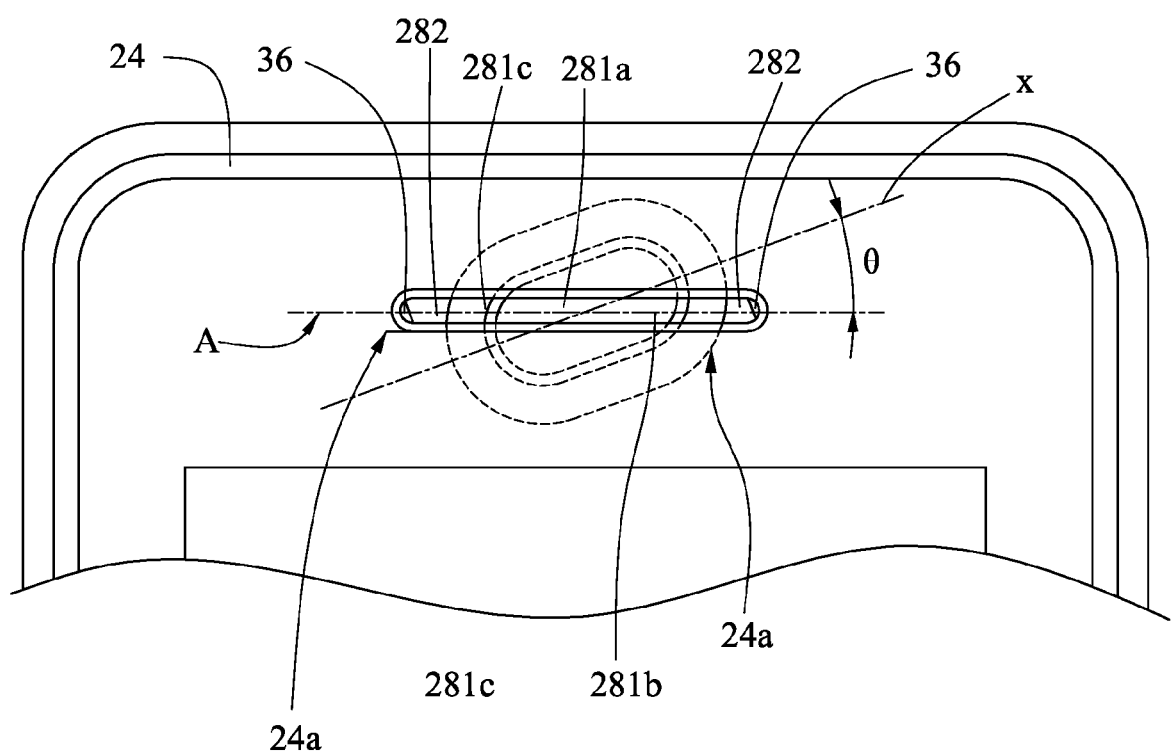
FIG. 3 is a partially enlarged view of an upper portion of the present electronic device of FIG. 1.
Figure 4:
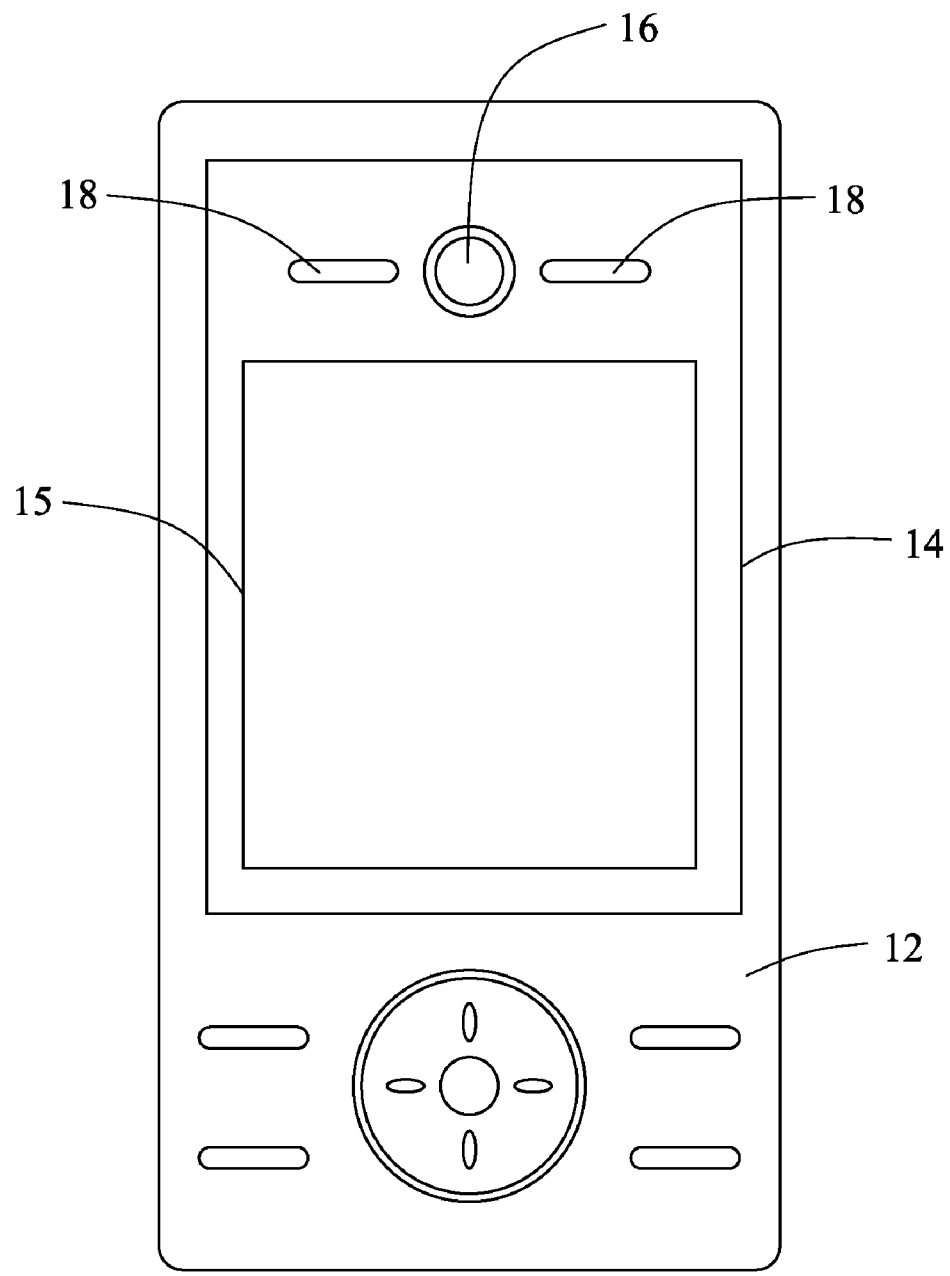
FIG. 4 is an assembled, isometric view of a conventional electronic device.

Referring to FIG. 3, the protective panel 24 is joined to the housing 22. To clearly illustrate the angled arrangement of the receiver 28, the speaker 281 is shown using dotted lines. The center of the receiver 28 aligns with the center of the main bore 24a of the protective panel 24. The major axis "x" of the receiver 28 and the main bore 24a form the included angle $\theta$.

In addition, as the length of the main bore 24a equals that of the receiver 28 and the receiver 28 is angled relative to the main bore 24a, the protective panel 24 respectively defines two secondary bores 36 at two ends of the main bore 24a, neither blocked by the frame 282 of the receiver 28. In other words, the main bore 24a partially overlaps the receiver 28 to form at least one secondary bore 36 on the main bore 24a. Therefore, audio output from the back area of the speaker 281 is conducted outwardly by the secondary bores 36, while the audio output from the front area 281a is conducted outwardly by the main bore 24a at the same time.

It is believed that the present embodiments and their advantages will be understood from the foregoing description, and it will be apparent that various changes may be made thereto without departing from the spirit and scope of the invention or sacrificing all of its material advantages, the examples hereinbefore described merely being preferred or exemplary embodiments of the invention.

What is claimed is:

1. An electronic device, comprising:
   a main board;
   a protective panel defining a main bore;
   a receiver, the receiver including a speaker, and the speaker including a front area and a back area, the front area and the back area having similar structures and being capable of conducting sounds received by the receiver; and
   a housing, the protective panel joined to an upper portion of the housing, the housing defining a first opening corresponding to the main bore and joined to the main board to form a chamber receiving the receiver;
   wherein the receiver and the main bore are angled relative to each other such that the main bore is partially overlapped by the receiver to form at least one secondary bore at end(s) of the main bore; and wherein the front area conducts the sounds received by the receiver outwardly through the main bore, and the back area conducts the sounds received by the receiver outwardly through the at least one secondary bore.

2. The electronic device as claimed in claim 1, wherein the receiver is angled on the main board such that the receiver and the main bore are angled relative to each other such that the main bore is partially overlapped by the receiver to form the at least one secondary bore at end(s) of the main bore.

3. The electronic device as claimed in claim 1, wherein the receiver further comprises a frame for receiving the speaker.

4. The electronic device as claimed in claim 3, wherein a major axis of the frame and the longitudinal axis of the main bore form an included angle.

5. The electronic device as claimed in claim 4, wherein the included angle is between about 5 and 35°.

6. The electronic device as claimed in claim 4, wherein the length of the main bore substantially equals the length of the frame, and the width of the main bore is smaller than the width of the receiver.

7. The electronic device as claimed in claim 1, wherein a center of the receiver aligns with a center of the main bore.

8. The electronic device as claimed in claim 1, wherein the length of the first opening substantially equals that of the receiver.

9. The electronic device as claimed in claim 1, further comprising a display arranged on the main board.

10. The electronic device as claimed in claim 9, wherein the housing defines a second opening corresponding to the location of the display on the main board.

11. The electronic device as claimed in claim 1, wherein the main board, the protective panel, and the housing are all substantially planar boards, and are substantially parallel to each other.

12. The electronic device as claimed in claim 11, wherein the receiver is a substantially planar board, and is substantially parallel to the protective panel and the main board.

* * * * *